United States Patent [19]
Yamada

[11] Patent Number: 4,479,844
[45] Date of Patent: Oct. 30, 1984

[54] IMPULSE-ACTION HEAT-SEALER

[75] Inventor: Teruo Yamada, Suita, Japan

[73] Assignee: Yugen Kaisha Fuji Seisakusho, Japan

[21] Appl. No.: 477,089

[22] Filed: Mar. 21, 1983

[30] Foreign Application Priority Data
Jun. 21, 1982 [JP] Japan .................... 57-92758[U]

[51] Int. Cl.³ .............................. B30B 15/34
[52] U.S. Cl. ................. 156/583.2; 100/93 P;
100/233; 100/259; 156/580; 156/583.9;
219/243; 493/189
[58] Field of Search ............ 156/515, 583.1, 583.2,
156/583.6, 583.7, 583.8, 583.9, 580; 100/93 P,
231, 233, 259; 493/189, 203; 219/243

[56] References Cited
U.S. PATENT DOCUMENTS

| | | | |
|---|---|---|---|
| 2,369,362 | 2/1945 | Marziani | 156/583.9 |
| 2,753,430 | 7/1956 | Winberg | 156/583.9 |
| 2,766,810 | 10/1956 | Gibson | 100/93 P |
| 4,082,941 | 4/1978 | Sukow et al. | 156/515 |

Primary Examiner—Michael Wityshyn
Attorney, Agent, or Firm—Hauke and Patalidis

[57] ABSTRACT

An impulse-action heat-sealer for manufacturing a sealed article, as a bag or the like, by pressingly keeping the portions to be sealed and effecting the sealing by means of heating with short-time electric current. The sealer has a pressing-sealer lever as is actuated electromagnetically, and is further equipped with an air-damper to function as a buffer for the actuating movement of the pressing-sealer lever.

4 Claims, 6 Drawing Figures

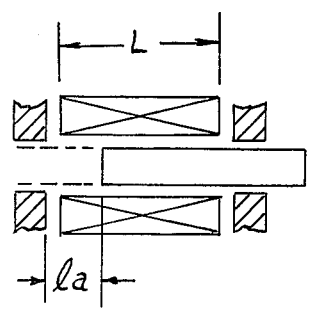
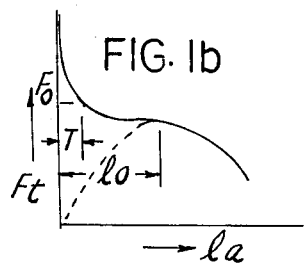
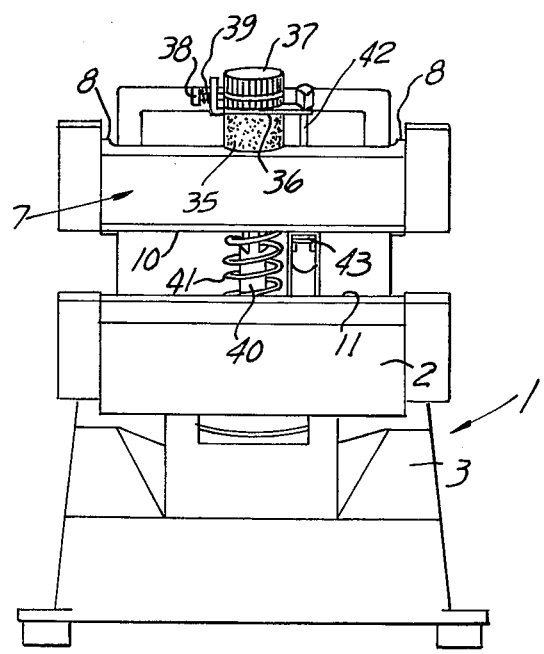
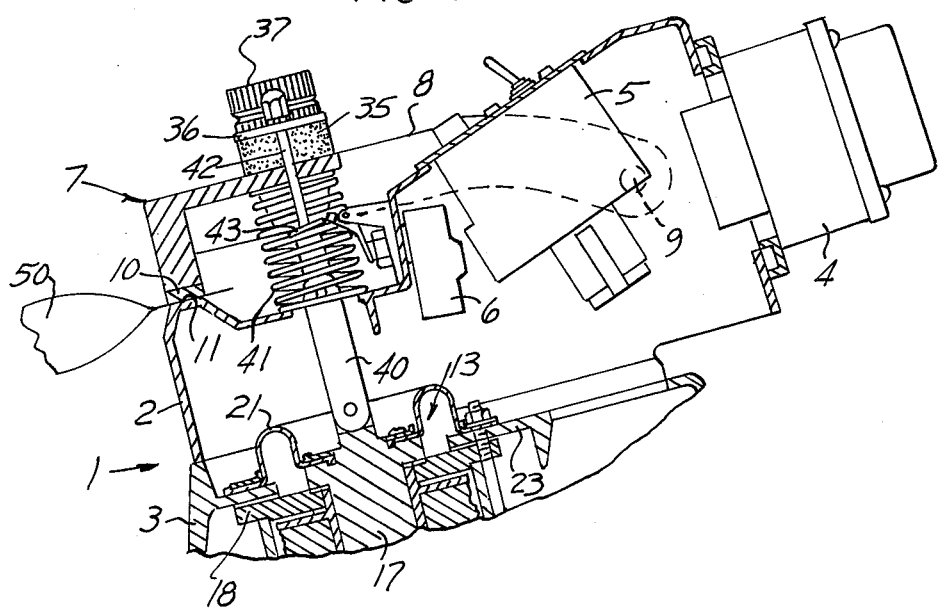

IMPULSE-ACTION HEAT-SEALER

BACKGROUND OF THE INVENTION

(1) Field of the Invention

This invention relates to impulse-action heat-sealers.

Meant by impulse-action heat-sealers are such apparatuses for manufacturing sealed articles, as bags and the like, by pressingly keeping the portions to be sealed, while effecting the sealing by introducing electric current for a short period of time to heater elements of Nichrome tape or the like, thus to instantaneously heat up the heaters to the sealing temperature, and then releasing the pressing abutment after a certain cooling period of time.

(2) Description of the Prior Art

Each of such heat-sealers as mentioned above is equipped with a pressing-sealer lever adapted to come into pressing abutment against and apart freely off from a sealer surface provided in a fixed stationary location on the part of the sealer body proper, and used as the power source of this lever is the manual or motor rotational power.

Intended to improve by this invention are the heat-sealers of the motor-driven type. In the case of such motor-driven type, it is apt to incur structure-complification and cost-raising, on account that there are needed a speed-reducer and a mechanism for transmission to the pressing-sealer lever, and also that there are effected quite frequent starting-up and halting-down operations. Besides, there is the fear of causing serious trauma or injury if fingers of the sealing work operator should by any chance inadvertently be interposed in between the sealer surface and the pressing-sealer lever as they are approaching to each other, in view that the driving force causing the displacement of the pressing-sealer lever must anyhow approximately be around the press sealing force itself as required, and if a safety mechanism is provided as measures to counter same, such will then incur further complication of the structure.

In view hereof, this invention intends to solve the problem of such prior art, making use of the fact that the attraction force of a direct-current electromagnet varies sharply responsive to various positioning of the iron core, but adoption of such direct-current electromagnet incurs on the other hand the problem as now described in detail hereunder.

Referring now to FIGS. 1a, 1b, attraction force Ft of a direct-current solenoid-type electromagnet equipped with a yoke iron shows quite wide variation in strength. Thus, in the practical range of $l_a = l_o \sim 0$ then $$Ft = \left( \frac{IN}{4.9L} + \left( \frac{IN}{3951 l_a} \right)^2 \right) S \text{ [Kg]} \quad 1$$

where
- I: Exciting current [A],
- N: Turn number of the coil,
- S: Iron core sectional area [cm$^2$],
- $l_a$: Stroke of the iron core,
- L: Length of the coil (or distance between magnetic poles of fixed members).

It means thus if and when the thickness T of a finger is approximately around that as illustrated, then even if such finger should inadvertently be interposed in between the sealer surface and the pressing-sealer lever, the attraction force at such time (finger compression force) Fo would be kept small.

However, considered hereinabove is the force to be exerted under supposition that the pressing sealer lever is in standstill, while in the actual sealing operation the pressing sealer lever undergoes movement and has considerably large moving inertia at the time of inadvertently coming into abutment against the finger. Since such total inertia is then transmitted to the finger, there accordingly still exists the danger of causing injury.

On the other hand, in the case same normally operates without any such interposition of fingers, then the pressing-sealer lever has its inertia or kinetic energy increased in an accelerative manner, and since same ultimately comes to an instantaneous halting upon shocking impingement against the sealer surface (sealed article), shock sound at such time as thus generates the noise is quite large. Besides, the shocking impingement force is therefore quite large as well, and there accordingly is apt to occur the breaking damage, fatigue or the like of the pressing-sealer lever and the sealer surface.

The problems mentioned just above may as a matter of course be dissolved if the exciting current is reduced down, but such is prone to cause defective sealing on account of insufficient sealing pressure.

By the way, the direct-current electromagnet has the advantages in comparison with the alternating-current electromagnet, on account that the magnetic flux is retained without alternation, such as 1 There are no hysteresis loss and eddy current loss, thus to make it possible to use blockwise iron core of pure iron, malleable steel and the like, which are simple and easy to work on and are strong mechanically.

2 There are no fluctuations in the attraction force, thus there are no humming noises as generated thereby.

3 The exciting current is defined by pure resistance of the coil (there being no reactance factor, contrary to the alternating current) and is thus stably constant throughout the entire operation.

SUMMARY OF THE INVENTION

The object of this invention is thus to realize the solution of the earlier-mentioned problems of the prior art, while dissolving the problems incidental to adopting the direct-current electromagnet as subsequently mentioned above.

The measures resorted to according to this invention for the purpose hereof may be summarized in items [I] and [II] as follows. Though the same is described here with addition of the reference numerals, as used in the drawings which refer to a specific embodiment as is described still later, and as may serve as an aid for quicker understanding; such should by no means be interpreted as limitative in any way to the technical scope of this invention.

[I] There is provided a pressing-sealer lever (7) having an actuation rod (34) equipped with a (movable) iron core (17); and a direct-current energization type electromagnetic coil (15) is mounted to the heat-sealer body proper (1).

[II] The said movable iron core (17) and electromagnetic coil (15) constitute a direct-current electromagnet (14) which is further equipped with an air-damper (13) to function as buffer means for actuation, thus movement, of the pressing-sealer lever (7) in the press-sealing direction.

Functions of the construction of the above items [I], [II] are as follows.

(A) As the exciting current, there is let to flow such proper current as is just sufficient for providing the press-sealing force needed for effecting the sealing as required. As already mentioned, this current is considerably intense and thus the magnetic attraction force exerted on the movable iron core (17), therefore the movement-actuating force of the pressing-sealer lever (7) as well, is large. Accordingly, it normally is logical to suppose that the movement speed of the pressing-sealer lever (7) is also large and moreover increases still acceleratively.

However, on account of the provision of buffer action by means of the said air-damper (13), resistance is provided against the movement of the movable iron core (17), therefore the movement of the pressing-sealer lever (7) as well. Since the compressing rate of the air within the air-damper (13) gets larger as the movement speed is larger, the resisting force as the buffer means gets then larger as well. Thereby, the pressing-sealer lever (7) is hindered from the accelerative movement, and is therefore caused to approach the sealer surface (11) with reduced speed variation and at a comparatively low speed.

Describing same in further detail, the attraction force of the electromagnet is approximately inversely proportional to the square of the distance. As to the air within the chamber, on the other hand, the pressure is approximately inversely proportional to the volume. These two interrelations are similar in general to each other, thus are in general resemblance to each other in shape when graphically represented, for instance. Thus, when considering the magnetic attraction force on the one hand and the buffer function by means of the air damper responsive in resistance to the attraction force on the other hand, they are so interrelated that the latter increases as well when the former increases, and therefore the rational buffer function is hereby provided.

Even if a finger should by any chance inadvertently be interposed, the pressing-sealer lever (7) must thus have at any such time only small inertia and moreover the movement-actuating force (finger compression force) in the standstill state of the pressing-sealer lever (7) must then be small as well, there is no danger of causing injury.

In the case the pressing-sealer lever (7) comes normally to abut against the article-to-be-sealed (50) laid on the sealer surface (11), without interposition of finger therebetween, shock sound generation is here suppressed and the shocking impingement force is small as well.

(B) When the pressing-sealer lever (7) ultimately comes to pressingly keep the article-to-be-sealed (50) on the sealer surface (11), it provides the press-sealing force strong enough as required for the heat-sealing operation. Providing the basis herefor is that the attraction force for the movable iron core (17) by means of the electromagnetic coil (15) gets high enough at this time, as may clearly be understood from the formula 1 and from FIG. 1b.

Accordingly, the merits of this invention may be itemized as:

(A) safety is guranteed for any possible inadvertent finger-interposing, (B) at the pressing abutment, shock sound as well as breaking damage, fatigue or the like of the pressing-sealer lever and the sealer surface, on account of such shocking impingement force, is suppressed, and yet, (C) large pressing abutment force is ultimately obtained as is required for the heat-sealing of the article to be sealed, as a bag or the like; and performance quality of the heat-sealing is high and excellent.

BRIEF DESCRIPTION OF THE DRAWINGS

FIG. 1a and FIG. 1b are a schematic view of a direct-current solenoid-type electromagnet and a graphic representation of its attraction force variation, FIG. 2 through FIG. 4 are views of one and the same specific embodiment, more particularly FIG. 2 is a side elevation with some parts in section, FIG. 3 is a front end view and FIG. 4 is a side elevation with some parts in section, showing the state during the active sealing stage.

DESCRIPTION OF THE PREFERRED EMBODIMENT

Figure 2:
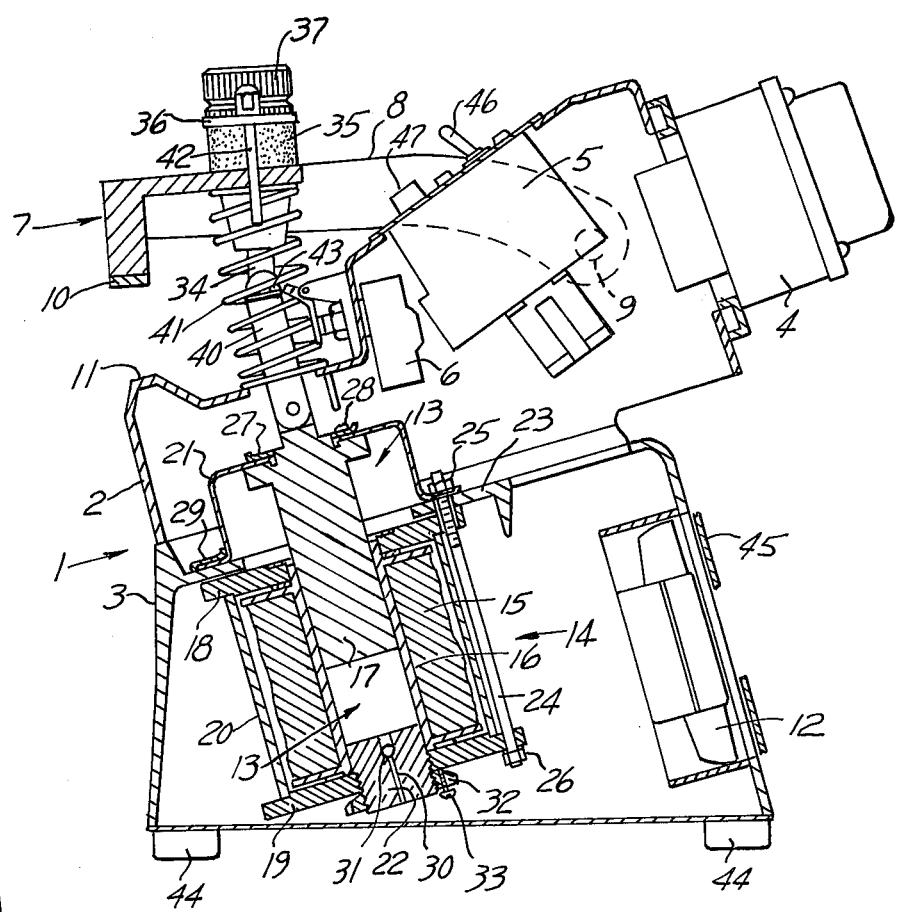

As shown in FIGS. 2 and 4, a heat-sealer body proper (1) consists of an upper frame (2) and a lower frame (3), as are connected together to make up a unitary entirety. The upper frame (2) is equipped with a transformer (4), a control box (5), a micro-switch (6) and a pressing-sealer lever (7).

The pressing-sealer lever (7) is in turn equipped with a pair of left and right arms (8), (8) as disposed for free rotative rocking on the respective pivots (9), (9).

The pressing-sealer lever (7) is further equipped with a silicone-rubber piece (10) as mounted for free attaching and detaching. Designated at (11) is a sealer surface corresponding to the silicone-rubber piece (10), and there is provided thereon a Nichrome tape (not illustrated) to function as a heater, covered by a Teflon tape (also not illustrated), for free attaching and detaching.

The lower frame (3) is equipped with an electromagnet (14) which is in turn equipped with a cooling fan (12) therefor and an air-damper (13).

The electromagnet (14) is of direct-current solenoid-clapper-type, and consists of an electromagnetic coil (15), a yoke (16) and a movable iron core (17).

The air-damper (13) is constructed with end covers (18), (19) and a tube (20), encasingly covering up the electromagnet (14), as well as a diaphragm (21) and an end pole piece (22) which dually serves also as a check-valve holder.

In between a party of a top plate (23) of the lower frame (3) and the upper end cover (18), on the one hand, and a mating party of the lower end cover (19), on the other hand, there are provided a plurality of tie-rods (24) as inserted thereacross and therethrough and as securely clamped by means of nuts (25), (26).

The diaphragm (21) has its inner periphery securely attached to the movable iron core (17) by means of a washer ring (27) and a plurality of clamping bolts (28), and has its outer periphery securely attached to the top plate (23) by means of a washer ring (29) and the alreadymentioned nuts (25).

The end pole piece (22) is in threaded engagement with the lower end cover (19), at the center portion of this latter. The end pole piece (22) has a through air-vent passage (30), and this passage (30) is equipped therein with a check valve (31). Designated at (32) is a lock-nut, and at (33) is a lock-bolt for blocking the rotation.

The electromagnet (14) thusly equipped with the air-damper (13), as described hereinabove, is disposed so as to correspond to the central location of the pressing-sealer lever (7), in the sense of the widthwise direction thereof. Similarly in the central location of the pressing-sealer lever (7), there is pierced therethrough an actuation rod (34) of the pressing-sealer lever (7), in such state as is permitted to slidingly move. A pressing-sealer resilient material (35), fitted on the actuation rod (34), is sandwiched in between a washer plate (36), also fitted on the actuation rod (34), and the pressing-sealer lever (7). An upper end portion of the actuation rod (34) is threaded and a sealing-pressure adjustment knob (37) is threadedly secured to the portion so that by means of rotatingly manipulating same the relative up-and-down positioning of the actuation rod (34) with respect to the pressing-sealer resilient material (35) may precisely be altered. Designated at (38) is a lock-bolt for the knob (37), and at (39) is a spring for locking the bolt (38) urgingly against idling rotation.

The actuation rod (34) and the movable iron core (17) are interconnected via a link (40) interposed between them as connected thereto at the respective ends in a bucklingly-yielding pivot-pin-articulation manner. In a mode of being fitted on both the link (40) and the actuation rod (34), in between the upper frame (2) and the pressing-sealer lever (7), there is interposed a compression spring (41) for restoringly urging the pressing-sealer lever (7) towards its non-operative, non-engaged position.

In a posture of extending parallel to the actuation rod (34), as is best clear in FIG. 3 in further reference to FIGS. 2 and 4, a switch-actuating rod (42) is fixedly secured on the washer plate (36), and is freely loosely pierced through an ample opening provided for this purpose in the pressing-sealer lever (7). This rod (42) thus moves up and down as an integral entirety together with the pressing-sealer lever (7), and is adapted to come to pressing abutment against an actuation lever (43) of the micro-switch (6) to thus rock same, just at the same time as the pressing-sealer lever (7) comes to pressing abutment on the sealer surface (11), when the resilient material (35) is further compressed as well, and to turn on the micro-switch (6) upon completion of secure pressing of the article to be sealed. Such turning on of the micro-switch (6) functions to supply current to the Nichrome tape on the sealer surface (11).

Designated at (44) are floor-engaging feet, at (45) a guard, at (46) a power switch, and at (47) a cycle-time-adjustment knob. The control box (5) is supposed to further be equipped with knobs for adjustments of current-supply period to the Nichrome tape and exciting-current-supply period to the electromagnetic coil (15).

As to operation, when the electromagnetic coil (15) is energized, the movable iron core (17) is then drawn in, causing the pressing-sealer lever (7) to lower down, via the link (40) and actuation rod (34), resisting the effort of the spring (41). In consequence hereof, the air within the air-damper (13) is compressed and provides the buffer function to the downward movement of the iron core (17), namely the downward movement of the pressing-sealer lever (7) as well.

The thusly compressed air is let to flow out at a slight small flow rate passing anyhow through the check valve (31) and then through the air-vent passage (30). Air pressure within the damper (13) thus gradually lowers down to approach the ultimate atmospheric pressure, and in this meanwhile the movement of the pressing-sealer lever (7) is effected at a low speed in a manner near a constant-speed state. In such state, it comes to pressing abutment on an article-to-be-sealed (50) on the sealer surface (11).

At the same time, the rod (42) functions via the lever (43) to turn on the micro-switch (6). The Nichrome tape on the sealer surface (11) is hereby energized, and by means of the instantaneous heating thereof in cooperation with the seal-pressing force of the pressing-sealer lever (7), the article-to-be-sealed (50) thus undergoes the heat-sealing.

Cooling as then required is attained simply by lapsing away of a certain time (short period such as 1 second or 2 seconds), and the electromagnetic coil (15) is then deenergized. Compression force as has stored in the spring (41) comes hereby actively to function, thus to restore the pressing-sealer lever (7) to its initial position. The restoring movement of the iron core (17), consequently the pressing-sealer lever (7) as well, is free and rapid, since in this time the check valve (31) is let or released to its open state.

By the way, the pressing-sealer resilient material (35) has hereinabove been supposed to be constructed as a resilient tubular body made of high-modulus foamed polyurethane, but it may otherwise as well be a coil spring or a leaf spring.

Figure 5:
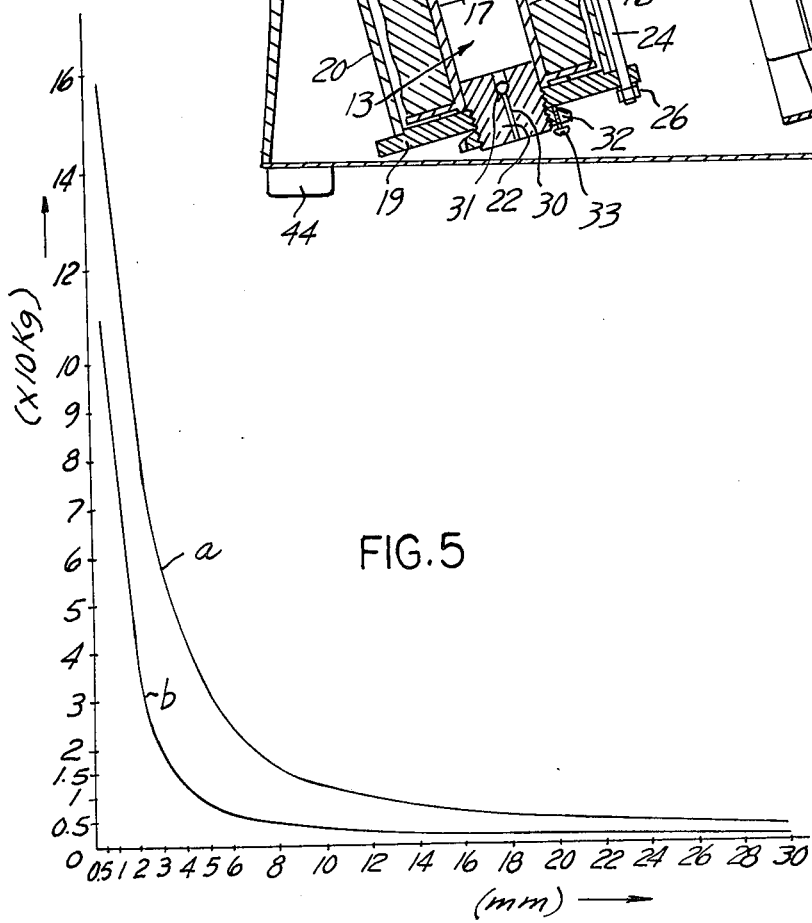
FIG. 5 is a graphical representation of the measured values as obtained with respect to the said specific embodiment.

Shown in FIG. 5 is the relationship between the distance and the magnetic attraction force, as measured with respect to the specific embodiment described hereinabove. Designated at (a) is a graph in the case of full-wave (1.0 A), and at (b) is in the case of half-wave [0.55]A. In either case, the power source is of a voltage of DC 89.8 V corresponding to the input AC 100 V.

I claim:

1. An impulse-action heat-sealer comprising a body proper, an electromagnet having an electromagnetic coil, an iron core movably mounted along an axis of said coil and a pressing sealing lever having an actuation rod connected to said iron core, wherein said coil is mounted on said body proper, said coil is of the direct-current energization type and said electromagnet is provided with an air-damper for buffering movement of said pressing-sealer lever.

2. The impulse-action heat-sealer of claim 1, wherein said electromagnet is of the solenoid-clapper type.

3. The impulse-action heat-sealer of claim 1, wherein said air-damper has an air-vent passage and a check valve disposed in said passage.

4. The impulse-action heat-sealer of claim 3, wherein said electromagnet is of the solenoid-clapper type.

* * * * *